(12) United States Patent
Smith et al.

(10) Patent No.: US 7,970,095 B2
(45) Date of Patent: Jun. 28, 2011

(54) RADIOISOTOPE PRODUCTION STRUCTURES, FUEL ASSEMBLIES HAVING THE SAME, AND METHODS OF USING THE SAME

(75) Inventors: David Grey Smith, Leland, NC (US); William Earl Russell, II, Wilmington, NC (US)

(73) Assignee: GE - Hitachi Nuclear Energy Americas LLC, Wilmington, NC (US)

( * ) Notice: Subject to any disclaimer, the term of this patent is extended or adjusted under 35 U.S.C. 154(b) by 196 days.

(21) Appl. No.: 12/078,705

(22) Filed: Apr. 3, 2008

(65) Prior Publication Data

US 2010/0284503 A1    Nov. 11, 2010

(51) Int. Cl.
*G21C 3/34*    (2006.01)
*G21C 1/04*    (2006.01)

(52) U.S. Cl. ........................................ 376/440; 376/347

(58) Field of Classification Search .................. 376/440, 376/347
See application file for complete search history.

(56) References Cited

U.S. PATENT DOCUMENTS

| | | | |
|---|---|---|---|
| 3,594,275 A * | 7/1971 | Rasohoff et al. ............... | 376/158 |
| 3,940,318 A | 2/1976 | Arino et al. | |
| 3,998,691 A | 12/1976 | Shikata et al. | |
| 4,038,137 A * | 7/1977 | Pugh ............................ | 376/440 |
| 4,196,047 A | 4/1980 | Mitchem et al. | |
| 4,284,472 A | 8/1981 | Pomares et al. | |
| 4,462,956 A | 7/1984 | Boiron et al. | |
| 4,475,948 A | 10/1984 | Cawley et al. | |
| 4,493,813 A | 1/1985 | Loriot et al. | |
| 4,532,102 A | 7/1985 | Cawley | |
| 4,597,936 A | 7/1986 | Kaae | |
| 4,617,985 A | 10/1986 | Triggs et al. | |
| 4,663,111 A | 5/1987 | Kim et al. | |
| 4,729,903 A | 3/1988 | McGovern et al. | |
| 4,782,231 A | 11/1988 | Svoboda et al. | |
| 4,859,431 A | 8/1989 | Ehrhardt | |
| 5,053,186 A | 10/1991 | Vanderheyden et al. | |
| 5,145,636 A | 9/1992 | Vanderheyden et al. | |
| 5,355,394 A | 10/1994 | Van Geel et al. | |
| 5,400,375 A | 3/1995 | Suzuki et al. | |
| 5,513,226 A | 4/1996 | Baxter et al. | |
| 5,596,611 A | 1/1997 | Ball | |
| 5,615,238 A | 3/1997 | Wiencek et al. | |
| 5,633,900 A | 5/1997 | Hassal | |
| 5,682,409 A | 10/1997 | Caine | |
| 5,758,254 A | 5/1998 | Kawamura et al. | |
| 5,867,546 A | 2/1999 | Hassal | |
| 5,871,708 A | 2/1999 | Park et al. | |
| 5,910,971 A | 6/1999 | Ponomarev-Stepnoy et al. | |

(Continued)

FOREIGN PATENT DOCUMENTS

JP        2006162612 A  *  6/2006

*Primary Examiner* — Rick Palabrica
*Assistant Examiner* — Erin B Leach
(74) *Attorney, Agent, or Firm* — Harness, Dickey & Pierce

(57) ABSTRACT

Example embodiments are directed to tie plate attachments having irradiation targets and/or fuel assemblies having example embodiment tie plate attachments with irradiation targets and methods of using the same to generate radioisotopes. Example embodiment tie plate attachments may include a plurality of retention bores that permit irradiation targets to be contained in the retention bores. Irradiation targets may be irradiated in an operating nuclear core including the fuel assemblies, generating radioisotopes that may be harvested from the spent nuclear fuel assembly by removing example embodiment tie plate attachments.

15 Claims, 4 Drawing Sheets

U.S. PATENT DOCUMENTS

| | | |
|---|---|---|
| 6,056,929 A | 5/2000 | Hassal |
| 6,160,862 A | 12/2000 | Wiencek et al. |
| 6,192,095 B1 | 2/2001 | Sekine et al. |
| 6,233,299 B1 | 5/2001 | Wakabayashi |
| 6,456,680 B1 | 9/2002 | Abalin et al. |
| 6,678,344 B2 | 1/2004 | O'Leary et al. |
| 6,751,280 B2 | 6/2004 | Mirzadeh et al. |
| 6,804,319 B1 | 10/2004 | Mirzadeh et al. |
| 6,895,064 B2 | 5/2005 | Ritter |
| 6,896,716 B1 | 5/2005 | Jones, Jr. |
| 7,157,061 B2 | 1/2007 | Meikrantz et al. |
| 7,235,216 B2 | 6/2007 | Kiselev et al. |
| 2002/0034275 A1 | 3/2002 | Abalin et al. |
| 2003/0012325 A1 | 1/2003 | Kernert et al. |
| 2003/0016775 A1 | 1/2003 | Jamriska, Sr. et al. |
| 2003/0103896 A1 | 6/2003 | Smith |
| 2003/0179844 A1 | 9/2003 | Filippone |
| 2004/0091421 A1 | 5/2004 | Aston et al. |
| 2004/0105520 A1 | 6/2004 | Carter |
| 2004/0196942 A1 | 10/2004 | Mirzadeh et al. |
| 2004/0196943 A1 | 10/2004 | Di Caprio |
| 2005/0105666 A1 | 5/2005 | Mirzadeh et al. |
| 2005/0118098 A1 | 6/2005 | Vincent et al. |
| 2006/0062342 A1 | 3/2006 | Gonzalez et al. |
| 2006/0126774 A1 | 6/2006 | Kim et al. |
| 2007/0133731 A1* | 6/2007 | Fawcett et al. ............... 376/202 |
| 2007/0133734 A1* | 6/2007 | Fawcett et al. ............... 376/438 |
| 2007/0297554 A1 | 12/2007 | Lavie et al. |
| 2008/0031811 A1 | 2/2008 | Ryu et al. |
| 2008/0076957 A1 | 3/2008 | Adelman |

* cited by examiner

"A"

RADIOISOTOPE PRODUCTION STRUCTURES, FUEL ASSEMBLIES HAVING THE SAME, AND METHODS OF USING THE SAME

BACKGROUND

1. Field

Example embodiments generally relate to fuel structures and radioisotopes produced therein in nuclear power plants.

2. Description of Related Art

Generally, nuclear power plants include a reactor core having fuel arranged therein to produce power by nuclear fission. A common design in U.S. nuclear power plants is to arrange fuel in a plurality of fuel rods bound together as a fuel assembly, or fuel assembly, placed within the reactor core. These fuel rods typically include several elements joining the fuel rods to assembly components at various axial locations throughout the assembly.

As shown in FIG. 1, a conventional fuel assembly 10 of a nuclear reactor, such as a BWR, may include an outer channel 12 surrounding an upper tie plate 14 and a lower tie plate 16. A plurality of full-length fuel rods 18 and/or part length fuel rods 19 may be arranged in a matrix within the fuel assembly 10 and pass through a plurality of spacers 20. Fuel rods 18 and 19 generally originate and terminate at upper and lower tie plates 14 and 16, continuously running the length of the fuel assembly 10, with the exception of part length rods 19, which all terminate at a lower vertical position from the full length rods 18. An upper end plug 15 and/or lower end plug 17 may join the fuel rods 18 and 19 to the upper and lower tie plates 14 and 16, with only the lower end plug 17 being used in the case of part length rods 19. Tie rods 28 may be full length rods placed at corner positions in fuel assembly 10 that securely join to upper and lower tie plates 14 and 16 and provide handling points for fuel assembly 10. The end plugs 15 and 17 may mate with, and in the case of tie rods 28, pass through, the upper and lower tie plates 14 and 16, respectively, and may secure fuel rods 18 or 19 axially in the fuel assembly 10.

SUMMARY

Example embodiments are directed to tie plate attachments having irradiation targets and fuel assemblies that use example embodiment tie plate attachments and methods of using the same to generate radioisotopes. Example embodiment tie plate attachments may include a plurality of retention bores that permit irradiation targets to be inserted and contained in the retention bores. The irradiation targets may be irradiated in an operating nuclear core including the fuel assemblies, generating useful radioisotopes that may be harvested from the spent nuclear fuel assembly by removing example embodiment tie plate attachments.

Example embodiment tie plate attachments may be connected to fuel assemblies via the upper tie plate, fuel rods, and/or channel surrounding the fuel assembly. Example embodiment tie plates may be held at a fixed axial position within fuel assemblies so as to expose irradiation targets therein to constant, lower-level neutron flux, thereby converting a substantial amount of the irradiation targets into useable radioisotopes.

BRIEF DESCRIPTIONS OF THE DRAWINGS

Example embodiments will become more apparent by describing, in detail, the attached drawings, wherein like elements are represented by like reference numerals, which are given by way of illustration only and thus do not limit the example embodiments herein.

DETAILED DESCRIPTION

Detailed illustrative embodiments of example embodiments are disclosed herein. However, specific structural and functional details disclosed herein are merely representative for purposes of describing example embodiments. The example embodiments may, however, be embodied in many alternate forms and should not be construed as limited to only example embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It will be understood that when an element is referred to as being "connected," "coupled," "mated," "attached," or "fixed" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between", "adjacent" versus "directly adjacent", etc.).

The terminology used herein is for the purpose of describing particular embodiments only and is not intended to be limiting of example embodiments. As used herein, the singular forms "a", "an" and "the" are intended to include the plural forms as well, unless the language explicitly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Figure 1:
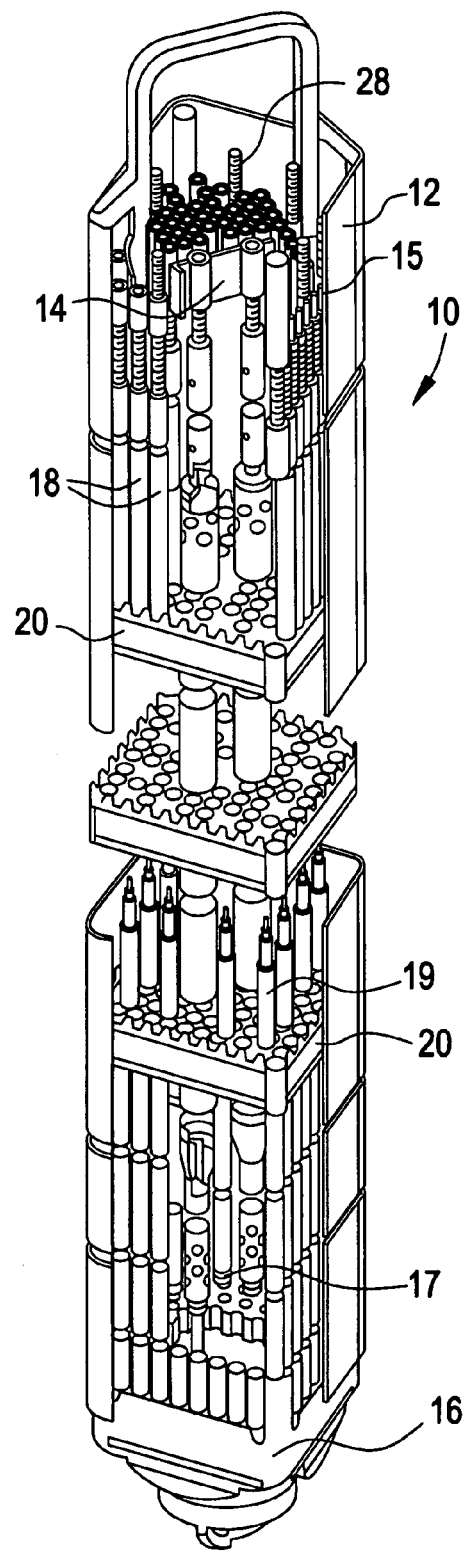
FIG. 1 is an illustration of a related art fuel assembly having no tie plate attachment.
Figure 2:
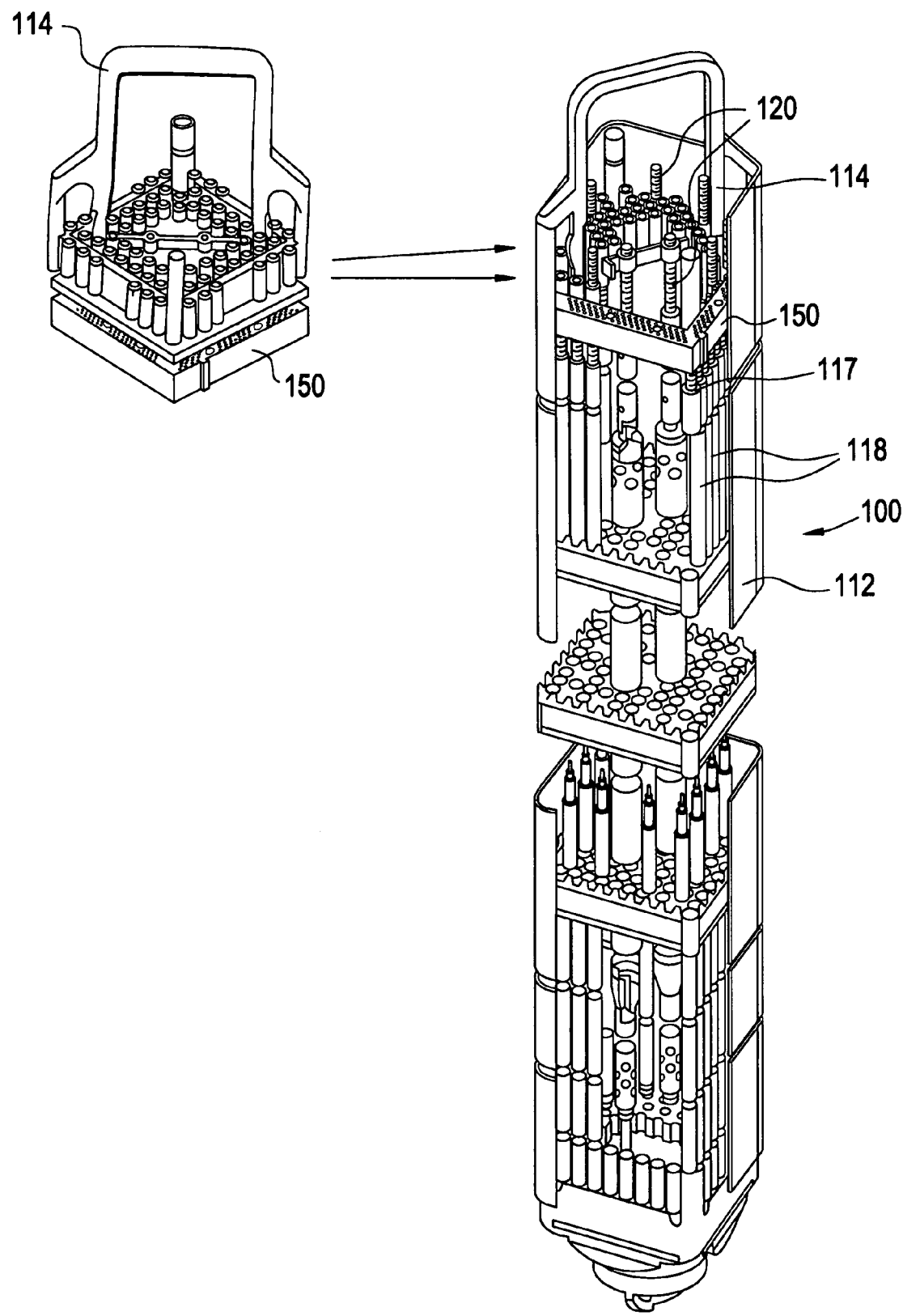
FIG. 2 is an illustration of an example embodiment fuel assembly having an example embodiment tie plate attachment.

FIG. 2 illustrates an example embodiment fuel assembly 100 including upper tie plate 114 and an example embodiment tie plate attachment 150 that individually or together may function as a radioisotope production structure. Example embodiment fuel assembly 100 may be similar to conventional fuel assemblies with the exception of including example embodiment tie plate attachment 150. Although example embodiment fuel assembly 100 is shown as similar to a conventional BWR type fuel assembly, other example embodiments, including PWR type fuel assemblies and unfinished fuel bundles, may be useable with tie plate attachments according to the present invention.

Example embodiment tie plate attachment 150 may be generally rectangular and frame full-length fuel rods 118 in fuel assembly 100. An outer perimeter of example embodiment tie plate attachment 150 may extend to about an outer perimeter of fuel assembly 100 formed by fuel rods 118 so as to form a substantially uniform axial profile within example embodiment fuel assembly 100.

Although example embodiment tie plate attachment 150 is shown as generally rectangular with a hollow center, other shapes are possible. For example, example embodiment tie plate attachments may extend along only one or two sides of example embodiment fuel assemblies instead of all four sides. Similarly, example embodiment tie plate attachments may have varied thicknesses or even extend through the entire cross-sectional profile of example embodiment fuel assemblies and have channels permitting coolant flow therethrough instead of having a hollow center. Example embodiment tie plate attachments may also have other shapes to match example embodiment fuel assemblies and tie plates therein, including hexagonal, triangular, etc. shapes.

In the example embodiment tie plate of FIG. 2, attachment 150 may have a cross-sectional edge thickness equal to a single row of fuel rods 118 along a transverse cross section of example embodiment fuel assembly 100. That is, example embodiment tie plate attachment 150 may surround, or be co-located with, the outer fuel rods 118 in example embodiment assembly 100. In this way, example embodiment tie plate attachment 150 may not significantly reduce or interfere with coolant flow through interior rods in assembly 100 and may be placed at a position with typically lower neutron flux within the assembly 100.

As shown in FIG. 2, example embodiment tie plate attachment 150 may be positioned under upper tie plate 114 in an axial direction. Example embodiment tie plate attachment 150 may be held under upper tie plate 114 in a variety of ways. For example, example embodiment attachment 150 may be directly welded to upper tie plate 114, forged into or be otherwise structurally continuous with upper tie plate 114, may fit into upper tie plate 114 frictionally and/or in a lock-and-key fashion, or may be joined to upper tie plate 114 via fasteners such as bolts or screws.

Figure 3:
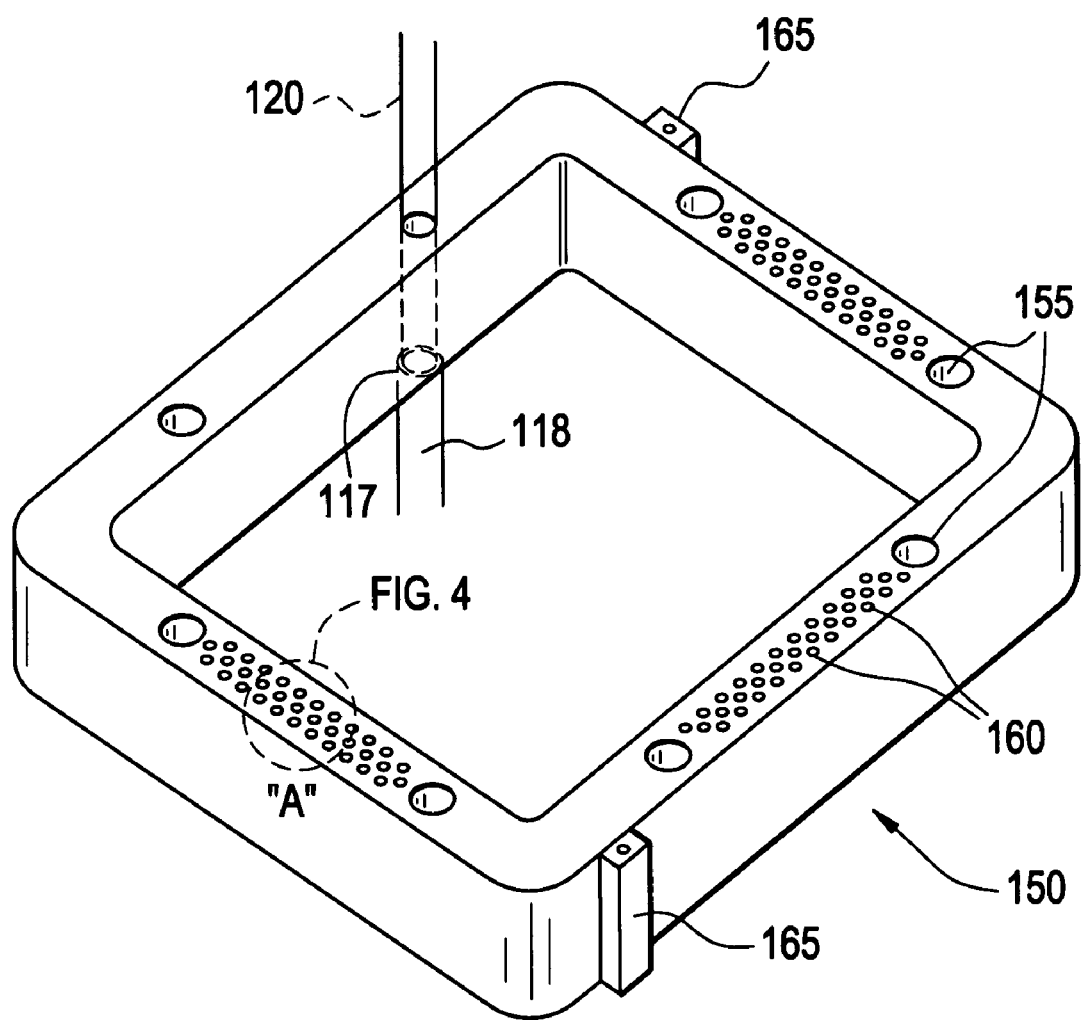
FIG. 3 is a detailed illustration of an example embodiment tie plate attachment.

As shown in FIGS. 2 and 3, as another attachment option, example embodiment tie plate attachment 150 may permit one or more fuel rods 118 and/or upper end and tie plugs 120 to pass axially through attachment 150 via holes 155 and into upper tie plate 114. Fuel rods 118 may thus fix example embodiment tie plate attachment 150 in a transverse position under upper tie plate 114. Example embodiment tie plate attachment 150 may be held in a constant axial position under tie plate 114 by fuel rods 118 seating into holes 155 or by flow of coolant through assembly 100 in an axial direction, and/or fixing example embodiment tie plate attachment 150 against upper tie plate 114. Or, for example, fuel rods 118 and/or upper end plugs 120 may be screwed into, locked into, welded onto, etc., example embodiment tie plate attachment 150 so as to hold attachment 150 in a constant axial position under upper tie plate 114.

Even further, example embodiment tie plate attachment 150 may attach to outer channel 112 by being welded and/or removably fitted into outer channel 112 surrounding example embodiment fuel assembly 100. Lateral extensions (discussed below) may facilitate such contact between outer channel 112 and example embodiment tie plate attachment 150.

In example embodiment fuel assemblies, example embodiment tie plate attachments may thus be held near or attached under an upper tie plate in the axial direction. This position affords easy access to example embodiment tie plate attachments during assembly disassembly, as the example embodiment tie plate attachment may be accessed with removal of the upper tie plate alone.

FIG. 3 is a detailed illustration of an example embodiment tie plate attachment 150. Although example embodiment tie plate attachment 150 is shown as a hollow rectangle that matches the shape of the outer channel 112, other shapes and orientations are possible as discussed above. Example embodiment tie plate attachment 150 is fabricated of a material that substantially maintains its physical and neutronic properties when exposed to conditions in an operating nuclear core, such that example embodiment tie plate attachment 150 does not interfere with or affect the neutron flux present in the operating reactor. Example embodiment tie plate attachments may be fabricated of, for example, stainless steel, Inconel, a nickel alloy, a zirconium alloy, aluminum, etc.

As discussed above, holes 155 may penetrate entirely through example embodiment tie plate attachment 150 and permit fuel rods 118 (shown in shadow) and/or upper end plugs 120 to pass through and/or connect to example embodiment tie plate attachment 150. As such, holes 155 may be sized with an inner diameter sufficiently greater than a fuel rod 118 and/or upper end plug 120 outer diameter. The example joining method of FIG. 3 shows example embodiment tie plate attachment 150 "sitting" on the shoulder 117 of the fuel rod 118 and upper end plug 120 joint. It is understood and several other joining methods discussed above and below may be used, including frictional contact between rods or end plugs and example embodiment tie plate attachments, lock-and-key, slot-type, or dovetail-type joints, welding, and/or continuous connection between the parts.

Example embodiment tie plate attachment 150 may include one or more lateral extensions 165 that facilitate positioning relative to and/or connection with channel 112. For example, lateral extensions 165 may connect or abut channel 112 on each side of example embodiment tie plate attachment 150 in order to center and/or secure example embodiment tie plate attachment 150 within example embodiment fuel assembly 100. Lateral extensions 165 may further match extensions and/or shape of the upper tie plate 114 in order to provide a consistent axial profile among upper tie plate 114 and example embodiment tie plate attachment 150.

Figure 4:
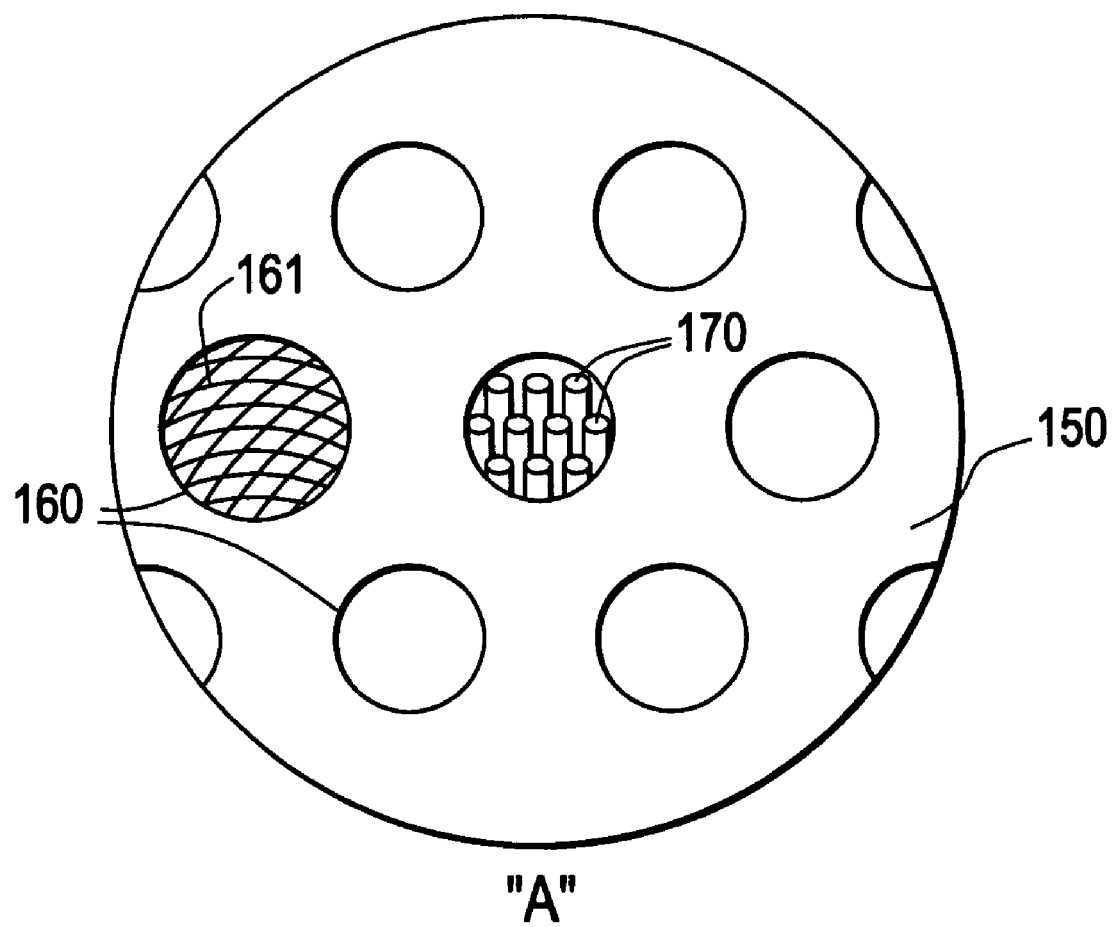
FIG. 4 is a detailed illustration of an example embodiment tie plate showing irradiation targets therein.

Example embodiment tie plate attachment 150 includes a plurality of retaining bores 160 in its top face into which one or more irradiation targets 170 are placed and contained, as shown in FIG. 4, which is a blown up portion of area A in FIG. 3. Bores 160 do not pass through example embodiment tie plate attachment 150 but instead have a depth sufficient to allow irradiation targets 170 to fit within bores 160. Bores 160 may be geometrically placed around or between holes 155. Alternatively, bores 160 may be scattered in no particular pattern throughout example embodiment tie plate attachment 150, so long as the structural integrity of attachment 150 is not compromised by the position and/or number of bores 160.

Irradiation targets 170 may be in the shape of small "seeds" or small rod shapes for insertion into retaining bores 160. Based on the size of bores 160, irradiation targets 170 may have a width and length to fit within bores 160 and may be, for example, on the scale of millimeters. Several irradiation targets 170 containing potentially different types of parent materials, including solids, liquids, and/or gasses, may be placed into a single retaining bore 160. Alternatively, each bore 160 may contain homogenous irradiation targets 170.

Irradiation targets 170 may be made of a variety of materials that substantially convert into radioisotopes when exposed to a neutron flux encountered under tie plates 114 in an operating nuclear reactor. Because neutron flux may be lower at axial ends of example embodiment fuel assembly 100 (FIG. 2), example embodiment tie plate attachments and irradiation targets 170 therein may be exposed to a lower flux as well. Hence, materials having high neutron cross sections and shorter half-lives may be preferable for use as irradiation targets 170, including, for example, Iridium-191, which may convert to Iridium-192 when exposed to neutron flux encountered in an operating nuclear reactor. Similarly, other isotopes, including Cobalt-59, Selenium-74, Strontium-88, and/or Iridium-191 for example, may be used as irradiation targets 170.

Retention bores 160 may be sealed or closed by a cap 161, shown in FIG. 4, that covers bores 160 and joins to example embodiment tie plate attachment 150. For example, caps 161 may be welded onto attachment 150 or screwed into bores 160, if the bores 160 are threaded. Other methods of securely attaching caps 161 over bores 160 in order to provide containment of irradiation targets 170 may be known and useable with example embodiments. Because cap 161 may provide containment to retention bores 160, irradiation targets 170 may contain or produce useful gaseous, liquid, and/or solid radioisotopes when exposed to a neutron flux, and these radioisotopes may be contained in irradiation bores 160 by cap 161 even though they may be liquid, gaseous, or solid.

Because of the higher axial position of example embodiment tie plate attachments, irradiation targets contained therein may be irradiated by lower amounts of neutron flux over a longer period of time, resulting in more predictable and effective generation of radioisotopes with shorter half-lives from irradiation targets having higher cross sections. Further, because upper tie plate areas, where example embodiment tie plate attachments may be placed, are associated with low fretting, example embodiment tie plate attachments may provide robust containment for irradiation targets. Lastly, upper tie plates may be easily removed from irradiated example embodiment fuel assemblies without disturbing fuel rods or irradiated fuel, permitting easier harvesting of example embodiment tie plate attachments and useful radioisotopes therein. Example embodiment tie plate attachments may further provide robust containment for retaining and containing solid, liquid, or gas radioisotopes produced from irradiation targets in example embodiment tie plate attachments.

Example embodiments thus being described, it will be appreciated by one skilled in the art that example embodiments may be varied through routine experimentation and without further inventive activity. For example, other fuel types, shapes, and configurations may be used in conjunction with example embodiment fuel assemblies and tie plate attachments. Variations are not to be regarded as departure from the spirit and scope of the exemplary embodiments, and all such modifications as would be obvious to one skilled in the art are intended to be included within the scope of the following claims.

What is claimed is:

1. A radioisotope production structure for use in a nuclear fuel assembly, the structure comprising:
   a tie plate attachment shaped to fit below a tie plate in the nuclear fuel assembly in an axial direction, the tie plate attachment defining at least one retention bore not passing entirely through the tie plate attachment, the tie plate attachment fabricated of a material that substantially maintains its physical and neutronic properties when exposed to the neutron flux in an operating nuclear reactor, the tie plate attachment further including a plurality of holes shaped and positioned to permit an end plug of a fuel rod of the nuclear fuel assembly to pass through the tie plate attachment and into the tie plate, the tie plate attachment being maintainable in an axial position by a shoulder at the joining of the fuel rod and the end plug; and
   at least one irradiation target configured to substantially convert to a radioisotope when exposed to a neutron flux in an operating nuclear reactor, the at least one irradiation target being placed in a corresponding retention bore such that at least a portion of the at least one irradiation target is embedded inside of the tie plate attachment.

2. The structure of claim 1, wherein the plurality of holes is shaped to seat against the fuel rod so as to lock the tie plate attachment against the tie plate.

3. The structure of claim 1, wherein the tie plate attachment is rectangular with an outer diameter that corresponds to an outer diameter of the tie plate.

4. The structure of claim 1, wherein the tie plate attachment further includes at least one lateral extension connecting the tie plate attachment to a channel surrounding the nuclear fuel assembly, the at least one lateral extension configured to hold the tie plate attachment in a constant axial position within the fuel assembly.

5. The structure of claim 1, wherein the tie plate attachment further including a cap joined to the tie plate attachment over the corresponding retention bore, the cap shaped to seal and fully enclose the irradiation target within the retention bore.

6. The structure of claim 5, wherein the irradiation target substantially converts to a liquid or gaseous radioisotope when exposed to the neutron flux in the operating nuclear reactor.

7. The structure of claim 5, wherein the irradiation target is at least one of a liquid and gas.

8. The structure of claim 1, wherein the irradiation target is at least one of Iridium-191, Selenium-74, Strontium-88, and Cobalt-59.

9. The structure of claim 1, wherein a plurality of irradiation targets are placed in the retention bore, at least a first irradiation target of the plurality being a first material and at least one of a second irradiation target of the plurality being a second material.

10. A radioisotope production structure for use in a nuclear fuel assembly, the structure comprising:
    a tie plate attachment shaped to fit below a tie plate in the nuclear fuel assembly in an axial direction, the tie plate attachment defining at least one retention bore not passing entirely through the tie plate attachment such that a bottom and sides of the bore are continuously defined by the tie plate attachment, the tie plate attachment fabricated of a material that substantially maintains its physical and neutronic properties when exposed to the neutron flux in an operating nuclear reactor, the tie plate attachment further including a plurality of holes shaped and positioned to permit an end plug of a fuel rod of the nuclear fuel assembly to pass through the tie plate attachment and into the tie plate, the tie plate attachment being maintained in an axial position by a shoulder at the joining of the fuel rod and the end plug; and
    at least one irradiation target configured to substantially convert to a radioisotope when exposed to a neutron flux in an operating nuclear reactor, the at least one irradiation target being inside of and retained by a corresponding retention bore.

11. The structure of claim 10, wherein the plurality of holes is shaped to seat against the fuel rod so as to lock the tie plate attachment against the tie plate.

12. The structure of claim 10, wherein the tie plate attachment is rectangular with an outer diameter that corresponds to an outer diameter of the tie plate.

13. The structure of claim 10, wherein the tie plate attachment further includes at least one lateral extension connecting the tie plate attachment to a channel surrounding the nuclear fuel assembly, the at least one lateral extension configured to hold the tie plate attachment in a constant axial position within the fuel assembly.

14. The structure of claim 10, wherein the tie plate attachment further including a cap joined to the tie plate attachment over the corresponding retention bore, the cap shaped to seal and fully enclose the irradiation target within the retention bore.

15. The structure of claim 10, wherein a plurality of irradiation targets are placed in the retention bore, at least a first irradiation target of the plurality being a first material and at least one of a second irradiation target of the plurality being a second material.

* * * * *